United States Patent [19]

Rovik

[11] Patent Number: 5,406,623
[45] Date of Patent: Apr. 11, 1995

[54] METHOD AND APPARATUS FOR RINGING TELEPHONE STATIONS

[75] Inventor: Jeffrey A. Rovik, Wheaton, Ill.

[73] Assignee: AT&T Corp., Murray Hill, N.J.

[21] Appl. No.: 54,662

[22] Filed: Apr. 23, 1993

[51] Int. Cl.⁶ .............................................. H04M 3/06
[52] U.S. Cl. .................................... 379/418; 379/251; 379/382; 379/399
[58] Field of Search ............... 379/418, 399, 255, 254, 379/253, 252, 251, 382

[56] References Cited

U.S. PATENT DOCUMENTS

| | | | |
|---|---|---|---|
| 4,071,709 | 1/1978 | Lee et al. | 379/252 |
| 4,201,897 | 5/1980 | Dorth et al. | 379/252 |
| 4,362,908 | 12/1982 | Melindo | 379/252 |
| 4,609,782 | 9/1986 | Brown | 379/418 |
| 4,797,917 | 1/1989 | Passetti et al. | 379/253 |
| 4,955,053 | 9/1990 | Siegmund | 379/255 |
| 5,001,748 | 3/1991 | Burns et al. | 379/418 |
| 5,073,924 | 12/1991 | Frisby | 379/414 |
| 5,228,081 | 7/1993 | Warner et al. | 379/399 |
| 5,260,996 | 11/1993 | Dillon et al. | 379/252 |

FOREIGN PATENT DOCUMENTS

| | | | |
|---|---|---|---|
| 0046563 | 3/1982 | Japan | 379/418 |
| 0122058 | 7/1984 | Japan | 379/418 |
| 0171352 | 9/1984 | Japan | 379/418 |

OTHER PUBLICATIONS

"Ringing System for Telephone Lines", R. E. Reynier, IBM Technical Disclosure Bulletin, vol. 12, No. 11, Apr. 1970.

Primary Examiner—James L. Dwyer
Assistant Examiner—Scott L. Weaver
Attorney, Agent, or Firm—David L. Hurewitz; Ross T. Watland

[57] ABSTRACT

A telephone ringing arrangement where a non-sinusoidal ringing voltage waveform is used that has significantly longer intervals during which the waveform is near zero as compared to a sinusoidal waveform. A connect interval is defined as the time during which the magnitude of the non-sinusoidal ringing voltage waveform remains less than a predefined threshold. The connect interval includes a zero-crossing of the ringing voltage waveform. For an illustrative ringing voltage waveform, the zero-crossing has zero slope. A ringing relay is controlled to connect the non-sinusoidal waveform to a telephone line such that the connection time, including relay bounce time, occurs only during one of the connect intervals. Similar principles may be used based on a disconnect interval of the ringing current waveform, to reduce transients on disconnection.

19 Claims, 12 Drawing Sheets

VOLTAGE ON RINGING CONDUCTOR R

RINGING GENERATOR

LINE CARD

METHOD AND APPARATUS FOR RINGING TELEPHONE STATIONS

TECHNICAL FIELD

This invention relates to telephony.

1. Background and Problem

Switching systems have for very many years provided high-voltage, low-frequency sinusoids, e.g., 95 volts rms at 20 hertz, to telephone lines to energize telephone station ringers. This has remained true even though very few present-day stations include bells. In modern stations, the high-voltage sinusoids are terminated at the station and are used as control signals to generate ringing signals.

In a switching system, a relay is used to selectively connect the ringing voltage to the telephone line. If the relay contacts close or open at a time when the ringing voltage or current is high, substantial voltage and current transients are developed due to the capacitive and inductive loads of telephone cables and telephone ringers. In modern switching systems with very sensitive digital circuitry, the high transients cause intermittent errors and increase the magnitude of electromagnetic interference produced.

2. Solution

These high transient problems are solved and a technical advance is achieved in accordance with the principles of the invention in an exemplary telephone ringing arrangement where an advantageously non-sinusoidal, ringing voltage waveform is used that has significantly longer intervals during which the waveform is near zero as compared to a sinusoidal waveform. A connect interval is defined as the time during which the magnitude of the non-sinusoidal ringing voltage waveform remains less than a predefined threshold. The connect interval includes a zero-crossing of the ringing voltage waveform. For an illustrative ringing voltage waveform, the zero-crossing has zero slope. A ringing relay is controlled to connect the non-sinusoidal waveform to a telephone line such that the connection time, including relay bounce time, occurs only during one of the connect intervals. Similar principles may be used based on a disconnect interval of the ringing current waveform, to reduce transients on disconnection.

A method of the invention is used in a telephone ringing arrangement including a ringing connection means for selectively effecting connection of ringing voltage to a telephone line. In accordance with the method, a periodic ringing voltage waveform is generated which differs from a sinusoidal voltage waveform in that the sinusoidal voltage waveform includes intervals of duration d during which the magnitude of the sinusoidal voltage waveform remains less than a predefined voltage threshold, whereas the ringing voltage waveform includes connect intervals of a longer duration $(d+x)$ during which the magnitude of the ringing voltage waveform remains less than the predetermined threshold. The ringing voltage waveform and the sinusoidal voltage waveform have the same rms value and x is a positive constant. The ringing voltage waveform is transmitted to the ringing connection means.

Illustratively, the ringing connection means is a relay of a given type and the positive constant x is dependent on the relay type. For example, when the given relay type has a nominal bounce time b, x is chosen such that $(d+x) >= b$. Typically, $d < b$.

A predefined dc voltage is provided on the telephone line in a scan state. When an incoming call is received, the predefined dc voltage is disconnected from the line. For the preferred operation of the transient reduction method, the predefined dc voltage is reconnected to the line advantageously before the ringing voltage waveform is connected.

A train of pulses is generated in synchronism with the ringing voltage waveform. The relay is controlled to connect the ringing voltage waveform to the line in response to a call and one of the pulses of the pulse train.

A method of the invention is used in a telephone ringing arrangement including a ringing connection means for selectively effecting connection of ringing current to a telephone line. In accordance with the method, a periodic ringing current waveform is generated which differs from a sinusoidal current waveform in that the sinusoidal current waveform includes intervals of duration e during which the magnitude of the sinusoidal current waveform remains less than a predefined current threshold, whereas the ringing current waveform includes connect intervals of a longer duration $(e+y)$ during which the magnitude of the ringing current waveform remains less than the predetermined threshold. The ringing current waveform and the sinusoidal current waveform have the same rms value and y is a positive constant. In the presence of the ringing current waveform, the ringing connection means is controlled to disconnect the ringing current waveform from the telephone line such that the disconnection occurs only during one of the disconnect intervals.

In accordance with a method of the invention, a periodic ac ringing voltage waveform is generated which, when connected to a telephone line, causes transmission of a periodic ac ringing current waveform. Each period of the ringing voltage waveform includes only one connect interval having only one zero-crossing. Each period of the ringing current waveform includes only one disconnect interval having only one zero-crossing. In the presence of the ringing voltage waveform, such voltage waveform is connected to a telephone line only during one of the connect intervals. In the presence of the ringing current waveform, such current waveform is disconnected from the telephone line only during one of the disconnect intervals.

Illustratively, the connect interval voltage zero-crossing and the disconnect interval current zero-crossing each have substantially zero slope.

A telephone ringing apparatus in accordance with the invention includes a ringing voltage generator that generates a periodic ringing voltage waveform which differs from a sinusoidal voltage waveform having the same rms value. The sinusoidal voltage waveform includes intervals of duration d during which the magnitude of the sinusoidal voltage remains less than a predefined voltage threshold, whereas the ringing voltage waveform includes connect intervals of a longer duration $(d+x)$ during which the magnitude of the ringing voltage waveform remains less than the predefined threshold, where x is a positive constant. The apparatus further includes a relay which selectively connects the ringing voltage waveform to a telephone line. The relay has bounce time. The relay is controlled to connect the ringing voltage waveform to the line such that the connection, including the bounce time, occurs only during one of the connect intervals.

Illustratively, the apparatus further includes a generator of a train of pulses in synchronism with the ringing voltage waveform. The controlling of the relay to connect the ringing voltage waveform to the line occurs in response to a call and one of the pulses. A capacitor is connected across the line to reduce transients caused by disconnection of the relay.

DRAWING DESCRIPTION

DETAILED DESCRIPTION

Figure 1:
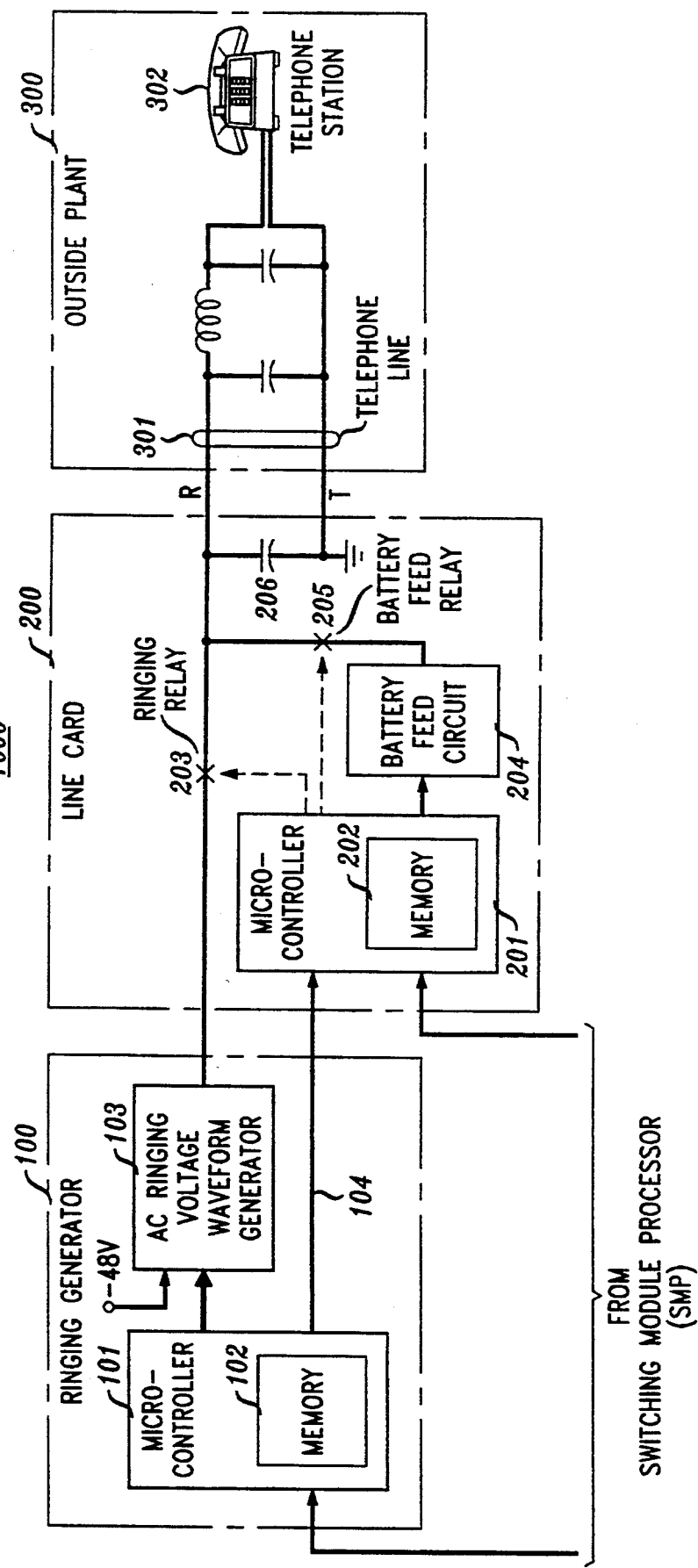
FIG. 1 is a circuit diagram of a telephone ringing arrangement that is usable to perform three exemplary methods in accordance with the invention.

The apparatus of telephone ringing arrangement 1000 (FIG. 1) is usable to perform three exemplary methods of the invention. Arrangement 1000 includes a ringing generator 100 and a line card 200, both of which are included in a telephone switching system (not shown). Arrangement 1000 also includes outside plant 300, i.e., telephone line 301 having tip (T) and ring (R) conductors, and telephone station 302.

Ringing generator 100 includes a programmable AC ringing voltage waveform generator 103, e.g., an AT&T 3 Type generator, and a microcontroller 101, e.g., an Intel 80C51, including a memory 102. Generator 103 develops a ringing voltage waveform by repetitively receiving voltage amplitude values stored in memory 102. Microcontroller 101 transmits pre-zero-crossing pulses on conductor 104 to control the times during which the generator 103 ringing voltage waveform can be applied to telephone line 301 or removed from line 301. Microcontroller 101 is responsive to instructions from a higher-level control processor SMP (not shown).

Line card 200 is used to interface telephone line 301 to the switching system. Only those elements that are important to the present invention are shown in FIG. 1. Line card 200 also has a microcontroller 201, e.g., an Intel 80C51, including a memory 202. Microcontroller 201 is responsive to instructions from control processor SMP (not shown), for controlling the operation of a ringing relay 203 and a battery feed relay 205, e.g., NEC EC2-5NW2, as well as a battery feed circuit 204 which provides −48 volts dc to conductor R of line 301. A capacitor 206, located either on line card 200 as shown in FIG. 1 or elsewhere, for example, on the main distributing frame of the switching office, is used to reduce transients caused by disconnection of ringing relay 203. However, the primary factors in controlling voltage and current transients in arrangement 1000 are the improved, non-sinusoidal ringing voltage and current waveforms generated by generator 103, and the waveform-synchronous methods for operating ringing relay 203 to apply the waveforms to line 301. In fact, the value of capacitor 206 can be increased over that of conventional ringing arrangements because of the use of the non-sinusoidal ringing voltage waveform.

First Exemplary Method

Figure 2:
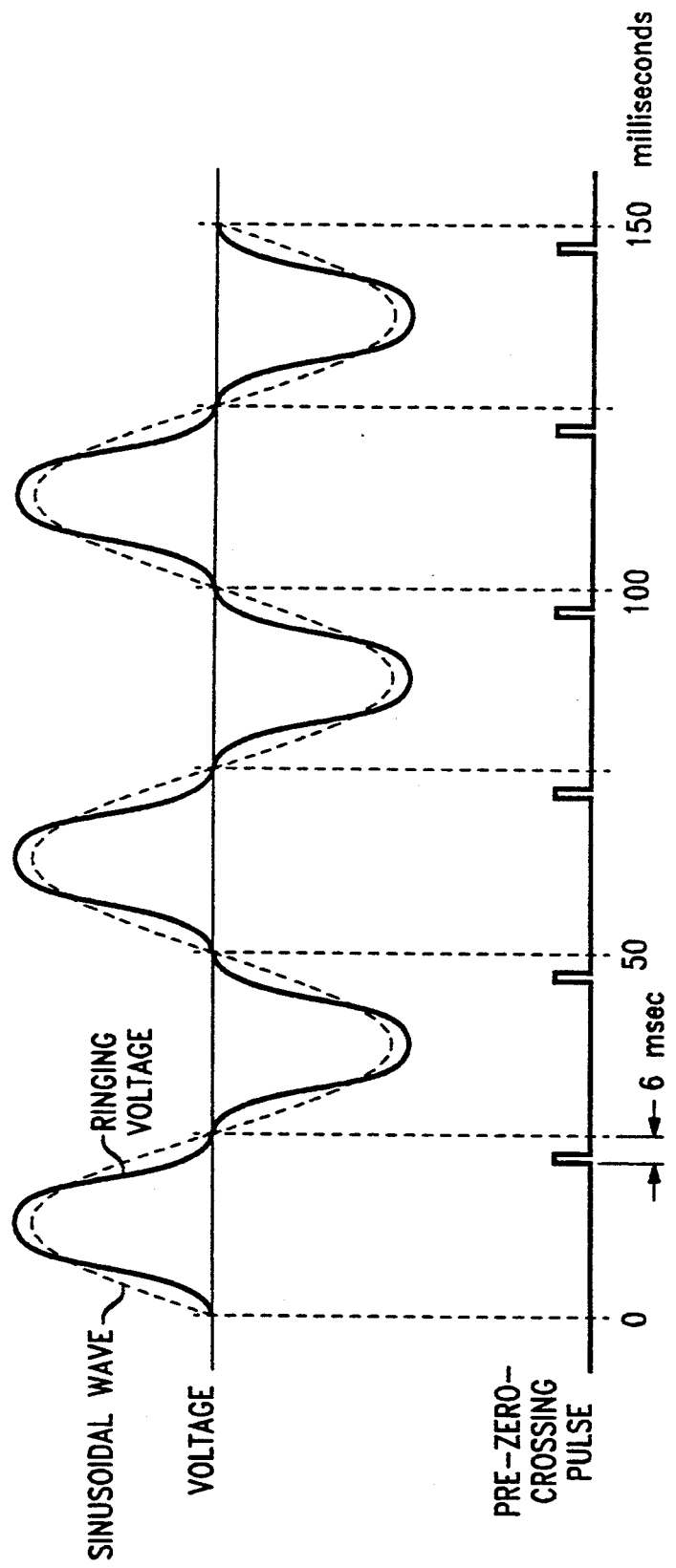
FIG. 2 is a diagram of a periodic ringing voltage waveform and a pulse train associated therewith when a first exemplary method is performed by the arrangement of FIG. 1.
Figure 3:
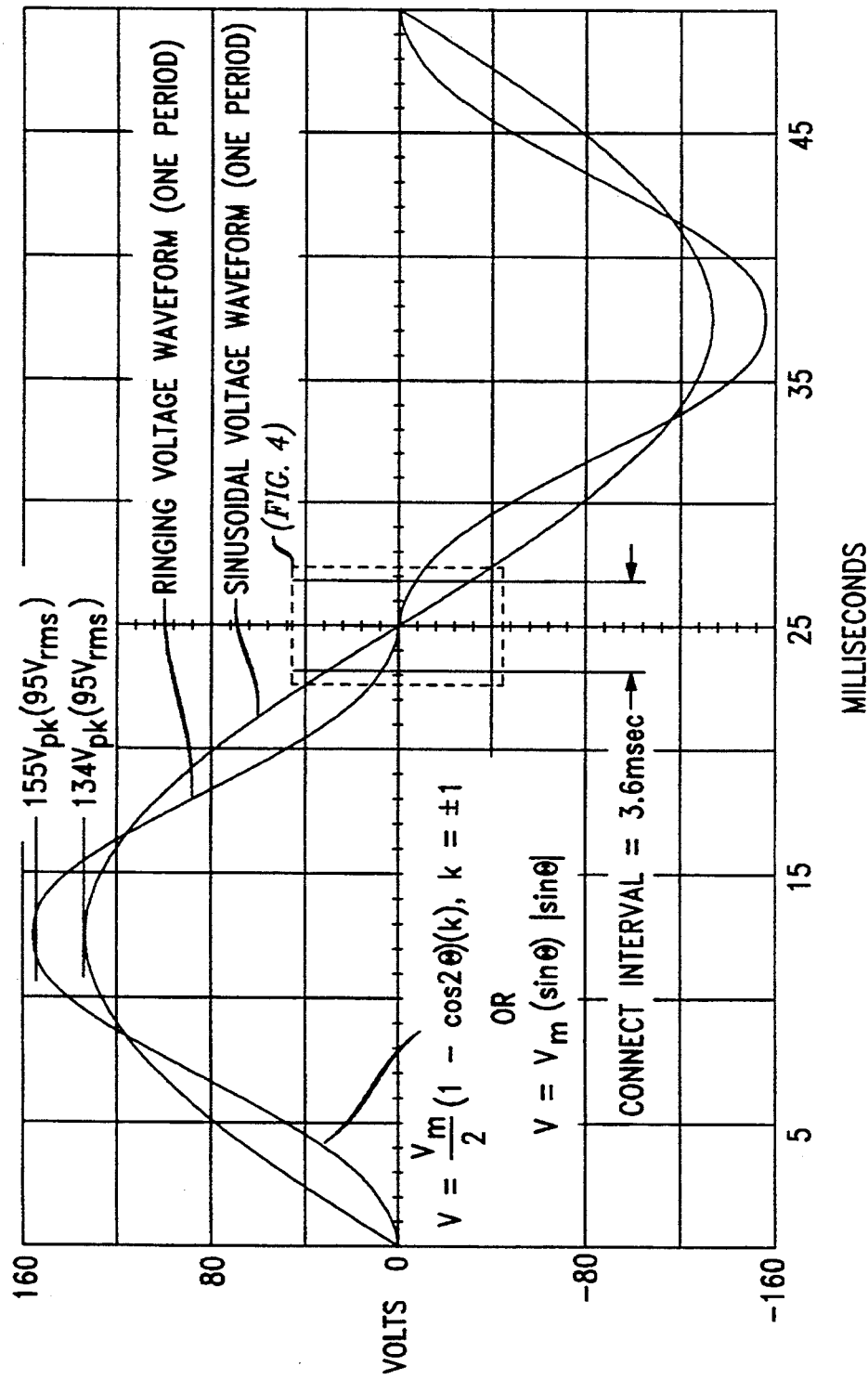
FIG. 3 is a diagram showing one period of the voltage waveform of FIG. 2.
Figure 4:
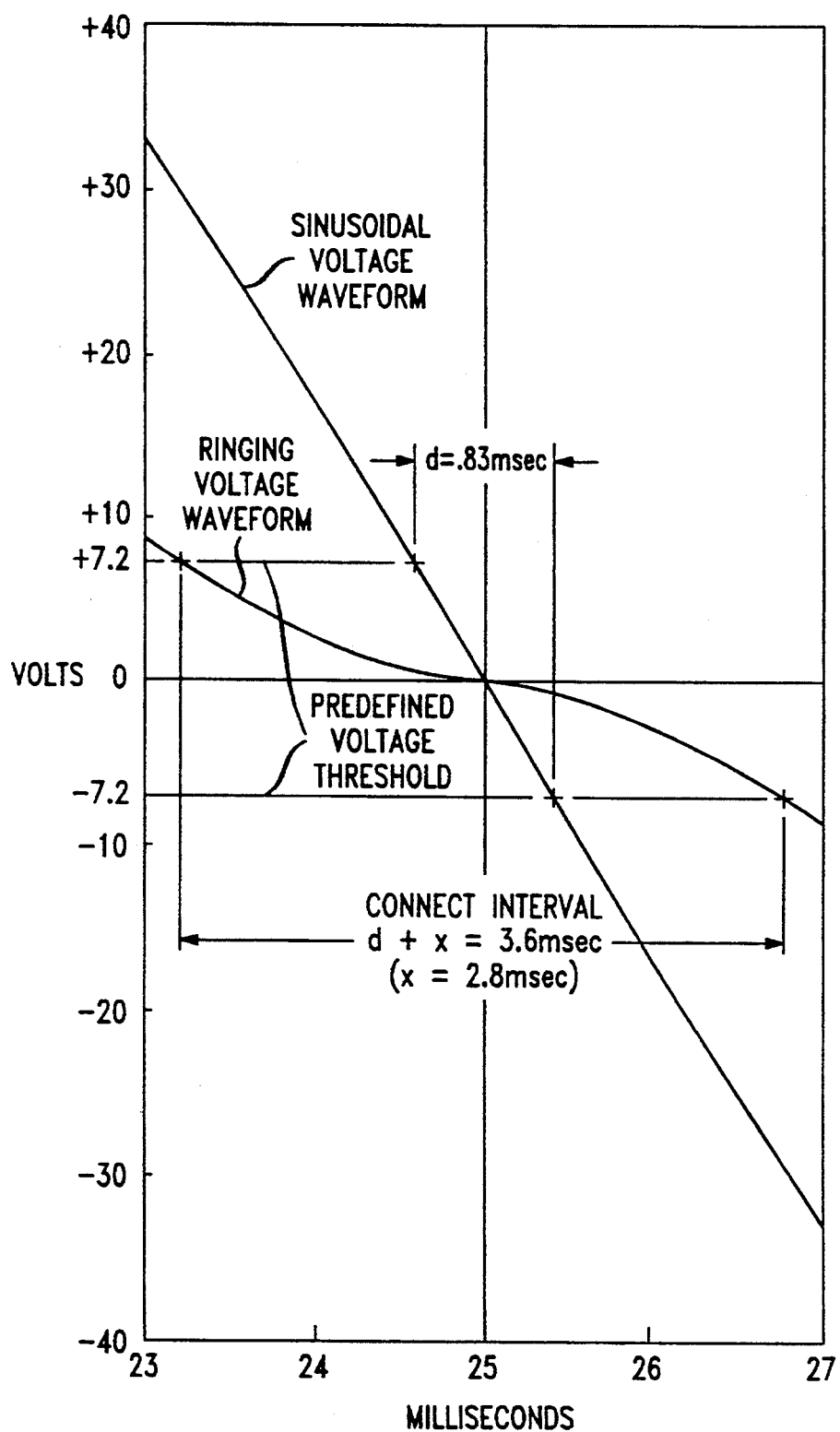
FIG. 4 is a diagram showing a connect interval included in the period of FIG. 3.

In a first method of the invention, generator 103 develops the non-sinusoidal ringing voltage waveform shown in FIG. 2. One 50-millisecond period of the ringing voltage waveform is compared in FIG. 3 to one 50-millisecond period of a sinusoidal voltage waveform having the same rms voltage of 95 volts. A connect interval of duration $(d+x)=3.6$ milliseconds during which the magnitude of the ringing voltage waveform remains less than a predefined voltage threshold of 7.2 volts is shown in greater detail in FIG. 4. Note that the interval of duration d during which the sinusoidal voltage waveform remains less than the 7.2-volt threshold is only 0.83 milliseconds. Accordingly in this example, $x=2.8$ milliseconds.

Figure 5:
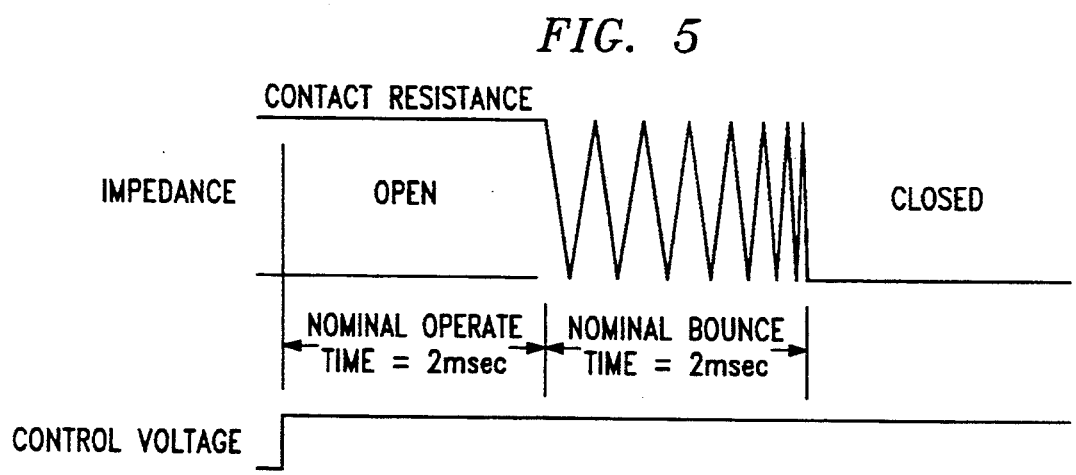
FIG. 5 is a diagram illustrating nominal characteristics of a relay of the type used as a ringing relay in the arrangement of FIG. 1.

Microcontroller 101 (FIG. 1) transmits a train of short-duration pre-zero-crossing pulses (FIG. 2) on conductor 104 to microcontroller 201. Note that each pulse occurs approximately six milliseconds prior to a zero-crossing of the ringing voltage waveform. After having received an instruction from control processor SMP to ring telephone line 301, microcontroller 201 responds to one of the pre-zero-crossing pulses by controlling the application of a control voltage to ringing relay 203. In the present example, relay 203 is of a type having a nominal operate time of two milliseconds and a nominal bounce time of two milliseconds (FIG. 5). The control voltage is applied to ringing relay 203 (FIG. 1) in such manner that its contacts close (including the bounce time) at some time during the 3.6-millisecond connect interval shown in FIGS. 3 and 4.

The positive constant x may be chosen based on a number of criteria. For example, the connect interval duration $(d+x)$ should be greater than or equal to b, the nominal bounce time for the relay type. Typically, the corresponding sinusoidal interval d is less than b. Since a single ringing generator 100 (FIG. 1) is used for a plurality of line cards 200, the variability in the bounce and operate times for different relays of a given type, and the repeatability of the bounce and operate times may be considered. The predefined, 7.2-volt threshold is determined based on the limits established for transients.

Figure 6:
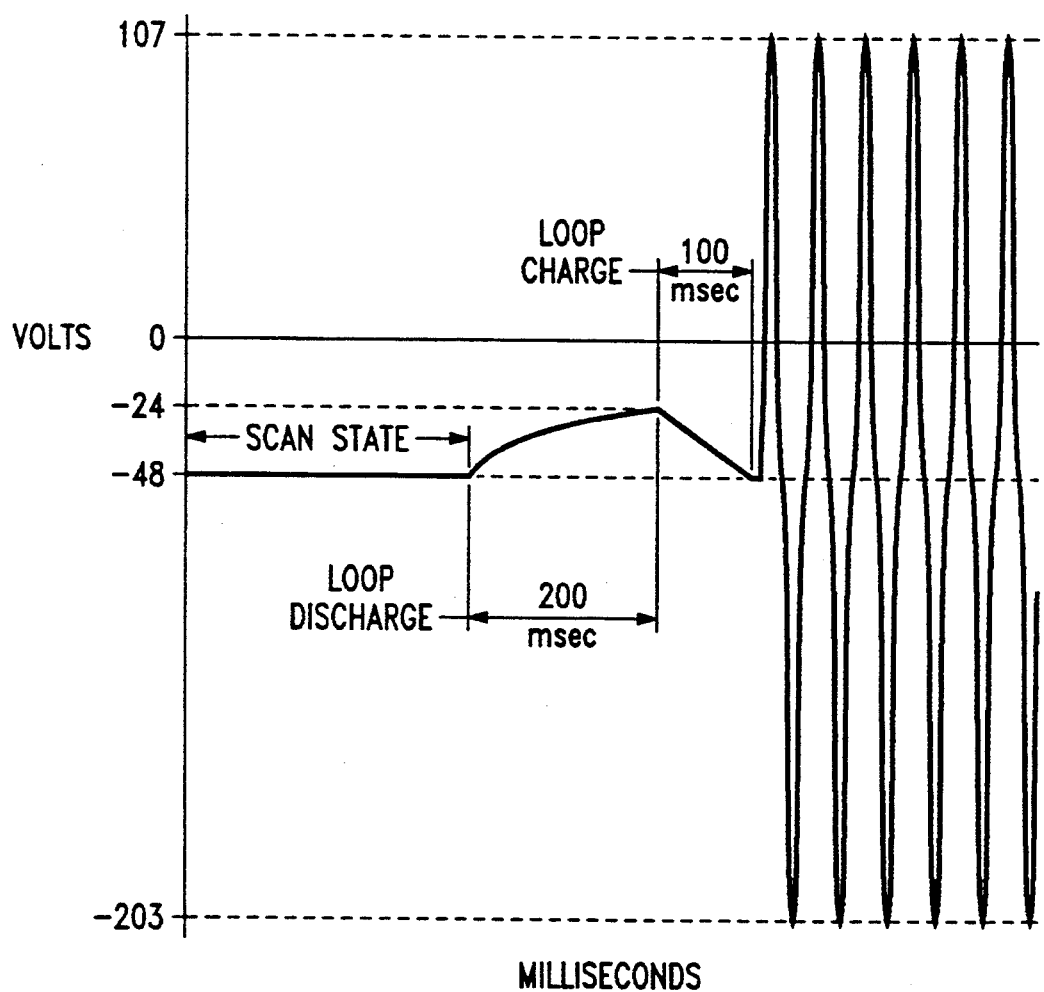
FIG. 6 is a diagram showing a combined dc and ac voltage waveform when an enhanced version of the first exemplary method is performed by the arrangement of FIG. 1.

FIG. 6 is a diagram showing a combined dc and ac voltage waveform when an enhanced version of the first exemplary method is performed by arrangement 1000 (FIG. 1). When telephone station 302 is on-hook, battery feed relay 205 is closed and telephone line 301 is in the SCAN state at −48 volts dc. When the control processor SMP requests that ringing voltage be applied to line 301, relay 205 is opened and, as tests are performed on line 301, line 301 discharges toward 0 volts dc. In accordance with the enhanced version of the first exemplary method, relay 205 is again closed and line 301 is recharged to −48 volts dc before the ringing voltage waveform is applied.

Second Exemplary Method

Figure 7:
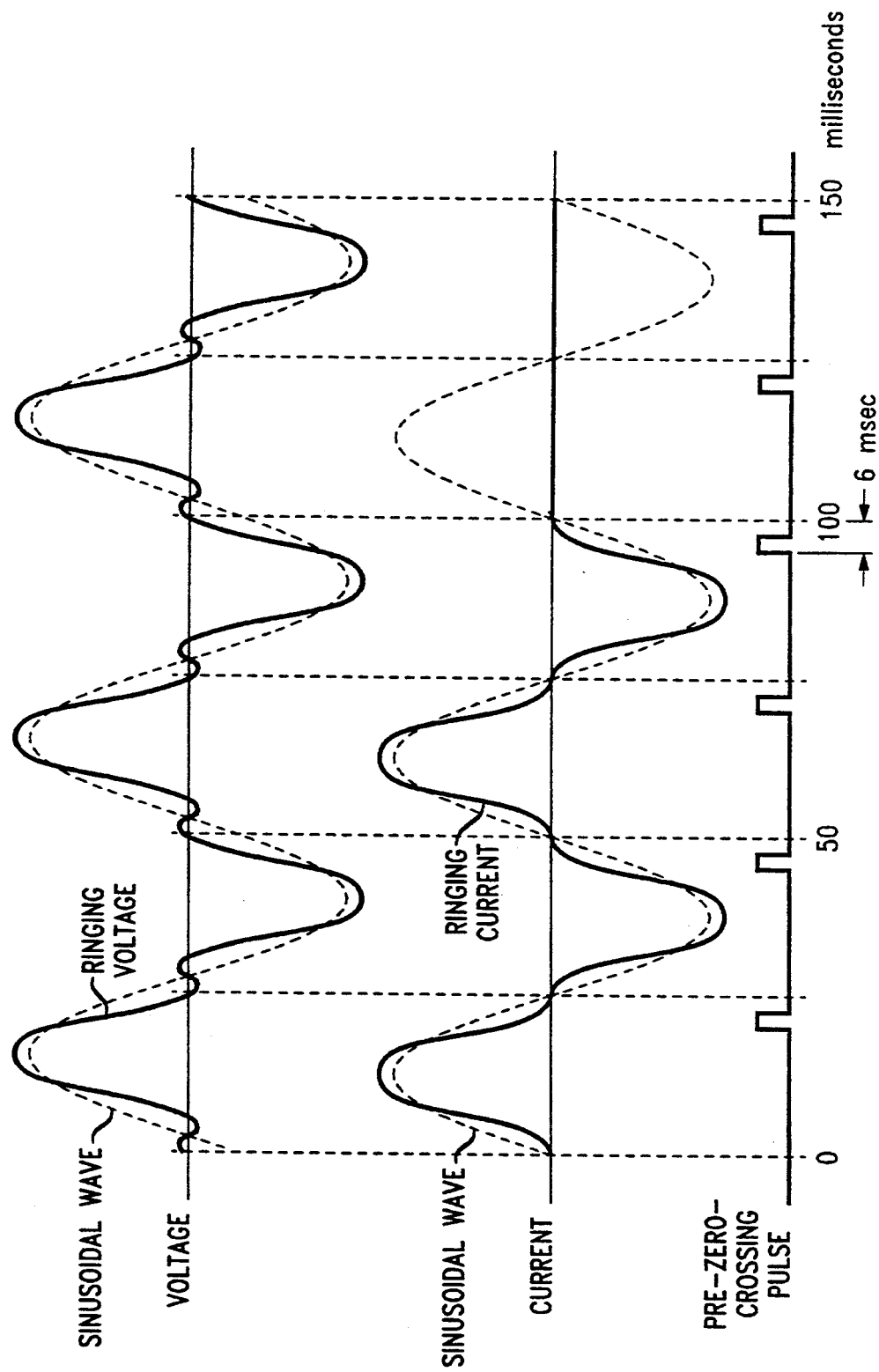
FIG. 7 is a diagram of periodic ringing voltage and current waveforms and a pulse train associated therewith when a second exemplary method is performed by the arrangement of FIG. 1.
Figure 8:
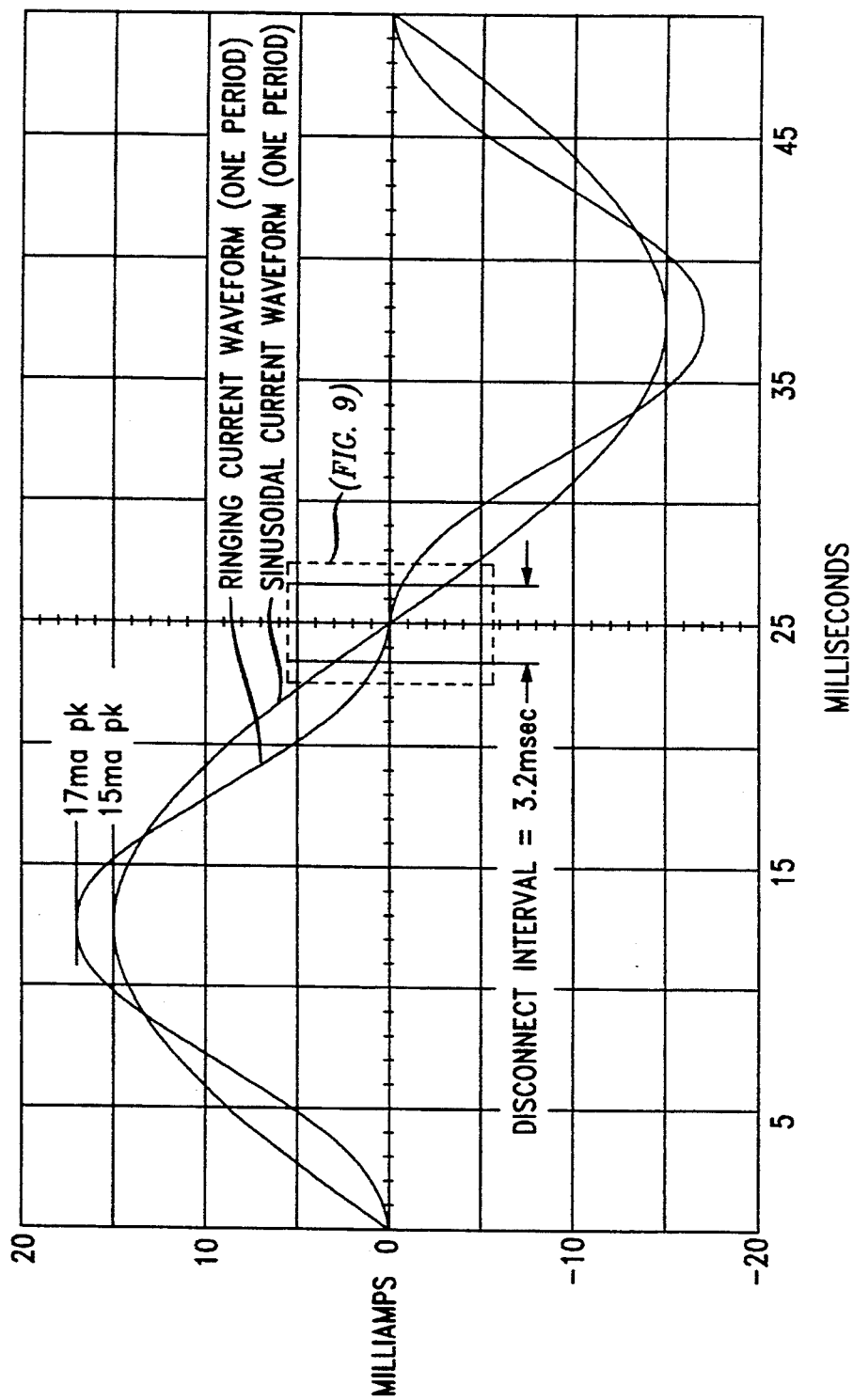
FIG. 8 is a diagram showing one period of the current waveform of FIG. 7.
Figure 9:
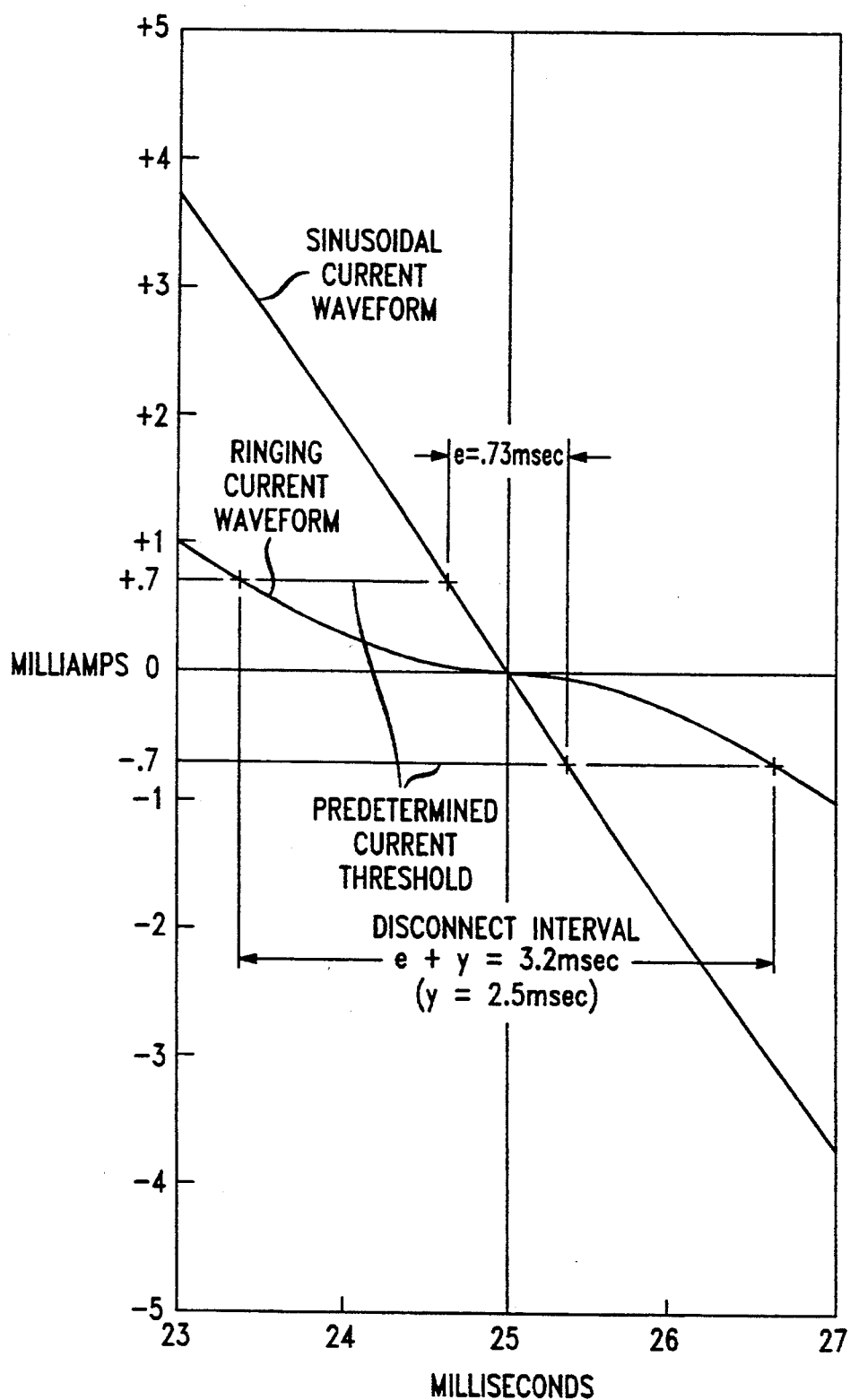
FIG. 9 is a diagram showing a disconnect interval included in the period of FIG. 8.

In a second method of the invention, generator 103 develops the ringing voltage waveform shown in FIG. 7. When ringing relay 203 is closed, a non-sinusoidal ringing current waveform is transmitted on line 301 as also shown in FIG. 7. One 50-millisecond period of the ringing current waveform is compared in FIG. 8 to one 50-millisecond period of a sinusoidal current waveform having the same rms current. A disconnect interval of duration (e+y)=3.2 milliseconds during which the magnitude of the ringing current waveform remains less than a predefined current threshold of 0.7 milliamps is shown in greater detail in FIG. 9. Note that the interval of duration e during which the sinusoidal current waveform remains less than the 0.7-milliamp threshold is only 0.73 milliseconds. Accordingly in this example, x=2.5 milliseconds.

Microcontroller 101 (FIG. 1) transmits a train of long-duration pre-zero-crossing pulses (FIG. 7) on conductor 104 to microcontroller 201. The pulses are long-duration pulses with respect to the short-duration pulses of FIG. 2. Note that each pulse occurs approximately six milliseconds prior to a zero-crossing of the ringing current waveform. After having received an instruction from control processor SMP to discontinue ringing on telephone line 301, microcontroller 201 responds to one of the pre-zero-crossing pulses by controlling the removal of the control voltage applied to relay 203. In the present example, relay 203 has a nominal disconnect operate time of two milliseconds. The control voltage is removed from ringing relay 203 in such manner that its contacts open at some time during the 3.2-millisecond disconnect time interval shown in FIGS. 8 and 9.

The positive constant y may be chosen based on a number of criteria. Since a single ringing generator 100 (FIG. 1) is used for a plurality of line cards 200, the variability in disconnect operate times for different relays of a given type and the repeatability of the disconnect operate time may be considered. The predefined 0.7-milliamp threshold is determined based on the limits established for transients.

Third Exemplary Method

Figure 10:
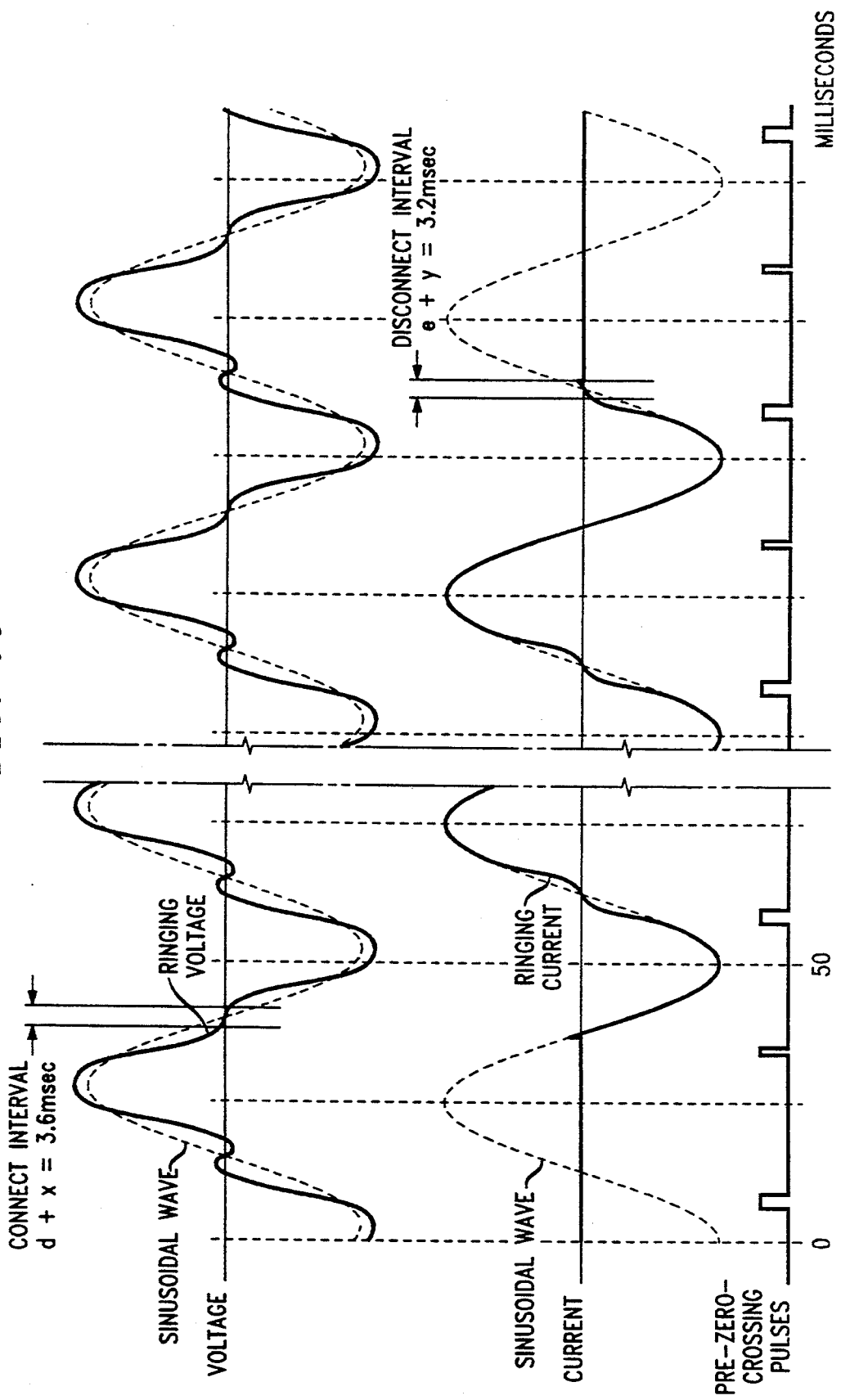
FIG. 10 is a diagram of periodic ringing voltage and current waveforms and a pulse train associated therewith when a third exemplary method is performed by the arrangement of FIG. 1.

In a third method of the invention, generator 103 develops the non-sinusoidal ringing voltage waveform shown in FIG. 10. When ringing relay 203 is closed, a non-sinusoidal ringing current waveform is transmitted on line 301 as also shown in FIG. 10. Each period of the ringing voltage waveform includes only one connect interval of duration (d+x)=3.6 milliseconds. The connect interval has only one zero-crossing of the voltage waveform. The zero-crossing has substantially zero slope. Each period of the ringing current waveform includes only one disconnect interval of duration (e+y)=3.2 milliseconds. The disconnect interval has only one zero-crossing of the current waveform. The zero-crossing has substantially zero slope. Each period of the voltage waveform of FIG. 10 represents a combination of half-periods of corresponding voltage waveforms for the first and second exemplary methods previously described.

Microcontroller 101 (FIG. 1) transmits a train of alternating short-duration and long-duration pre-zero-crossing pulses (FIG. 10) on conductor 104 to microcontroller 201. After having received an instruction from control processor SMP to ring telephone line 301, microcontroller 201 responds to one of the short-duration pre-zero-crossing pulses by controlling the application of a control voltage to ringing relay 203. The control voltage is applied to ringing relay 203 in such manner that its contacts close at some time during the connect time interval. Later, after having received a further instruction from control processor SMP to discontinue ringing on telephone line 301, microcontroller 201 responds to one of the long-duration pre-zero-crossing pulses by removing the control voltage from ringing relay 203 in such manner that its contacts open at some time during the disconnect time interval.

Figure 11:
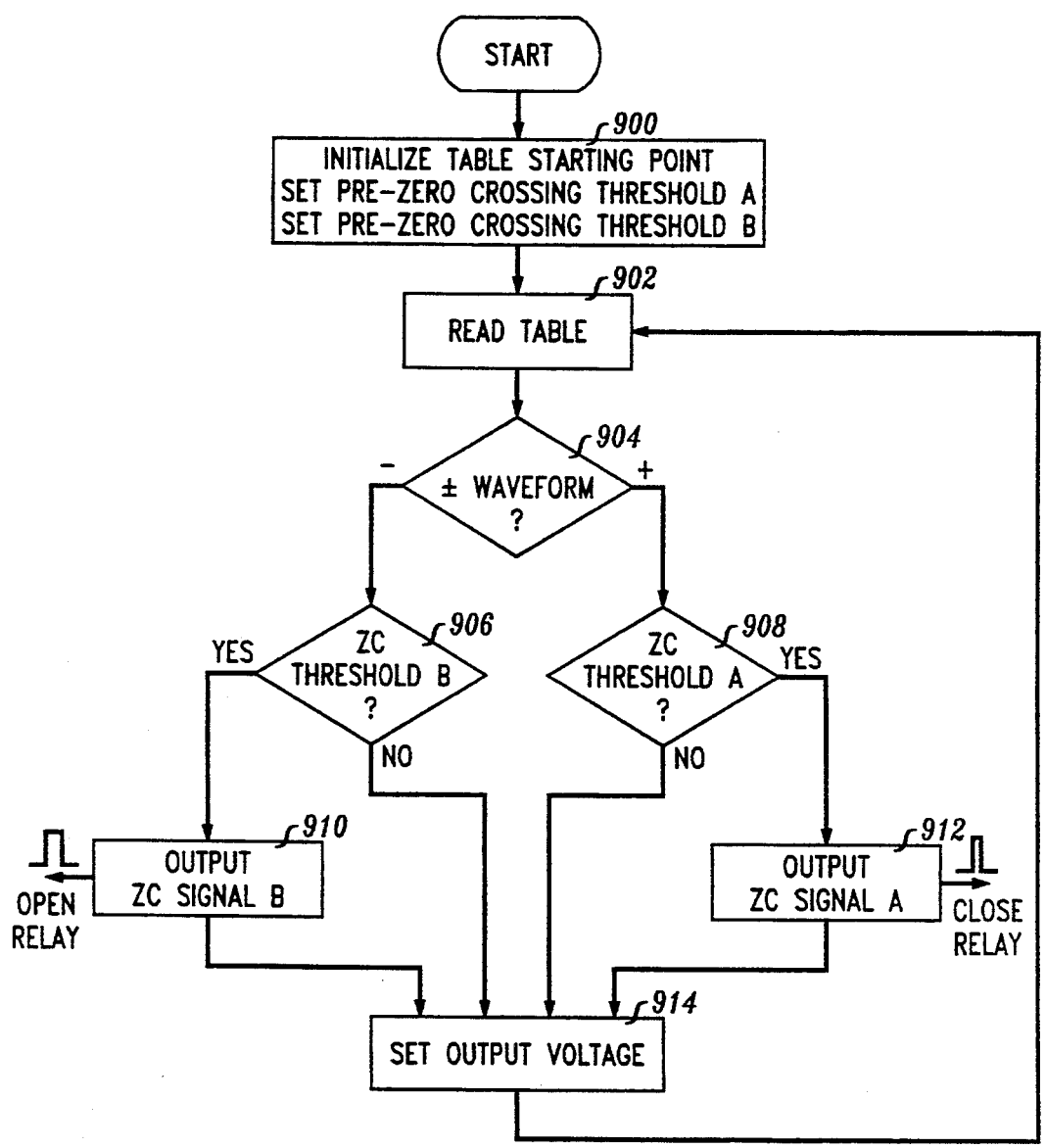
FIG. 11 is a flow chart describing the operation of a ringing generator included in the arrangement of FIG. 1 when the third exemplary method is performed.

FIG. 11 is a flow chart describing the operation of ringing generator 100 (FIG. 1) when the third exemplary method is performed. The processing occurs in microcontroller 101. In block 900, a read address is defined to be the initial location of the voltage waveform table stored in memory 102. In the present embodiment, the table includes 128 values per period. Also in block 900, two pre-zero crossing voltage thresholds A and B are set. These thresholds define the voltage waveform values at the instants that short-duration or long-duration pre-zero-crossing signals are to be generated. Execution continues to block 902 where the voltage amplitude value is read from memory 102. In decision block 904, it is determined whether the read value is from the positive or negative part of the voltage waveform. If it is from the positive part, execution branches to block 908 and the voltage amplitude value is compared with the preset pre-zero-crossing threshold A. If the threshold has not been reached, execution continues to block 914, and the voltage amplitude value is transmitted to generator 103 to change the voltage on line 301. Execution returns to block 902 and the next table value is read. This process repeats until it is determined in block 908 that the preset pre-zero-crossing threshold A has been reached. Execution branches to block 912 and microcontroller 101 transmits a short-duration pulse (ZC signal A) on line 104. Only one short-duration pulse is transmitted per period. The process repeats until the negative part of the voltage waveform is reached and this is detected in block 904. Execution then branches to block 906 and the voltage amplitude value is compared with the preset pre-zero-crossing threshold B. If the threshold has not been reached, execution continues to block 914, and the voltage amplitude value is transmitted to generator 103 to change the voltage on line 301. Execution returns to block 902 and the next table value is read. This process repeats until it is determined in block 906 that the preset pre-zero-crossing threshold B has been reached. Execution branches to block 910 and microcontroller 101 transmits a long-duration pulse (ZC signal B) on line 104. Only one long-duration pulse is transmitted per period. This process repeats until it is determined in block 904 that the positive part of the waveform has again been reached and operation continues in the described manner.

Figure 12:
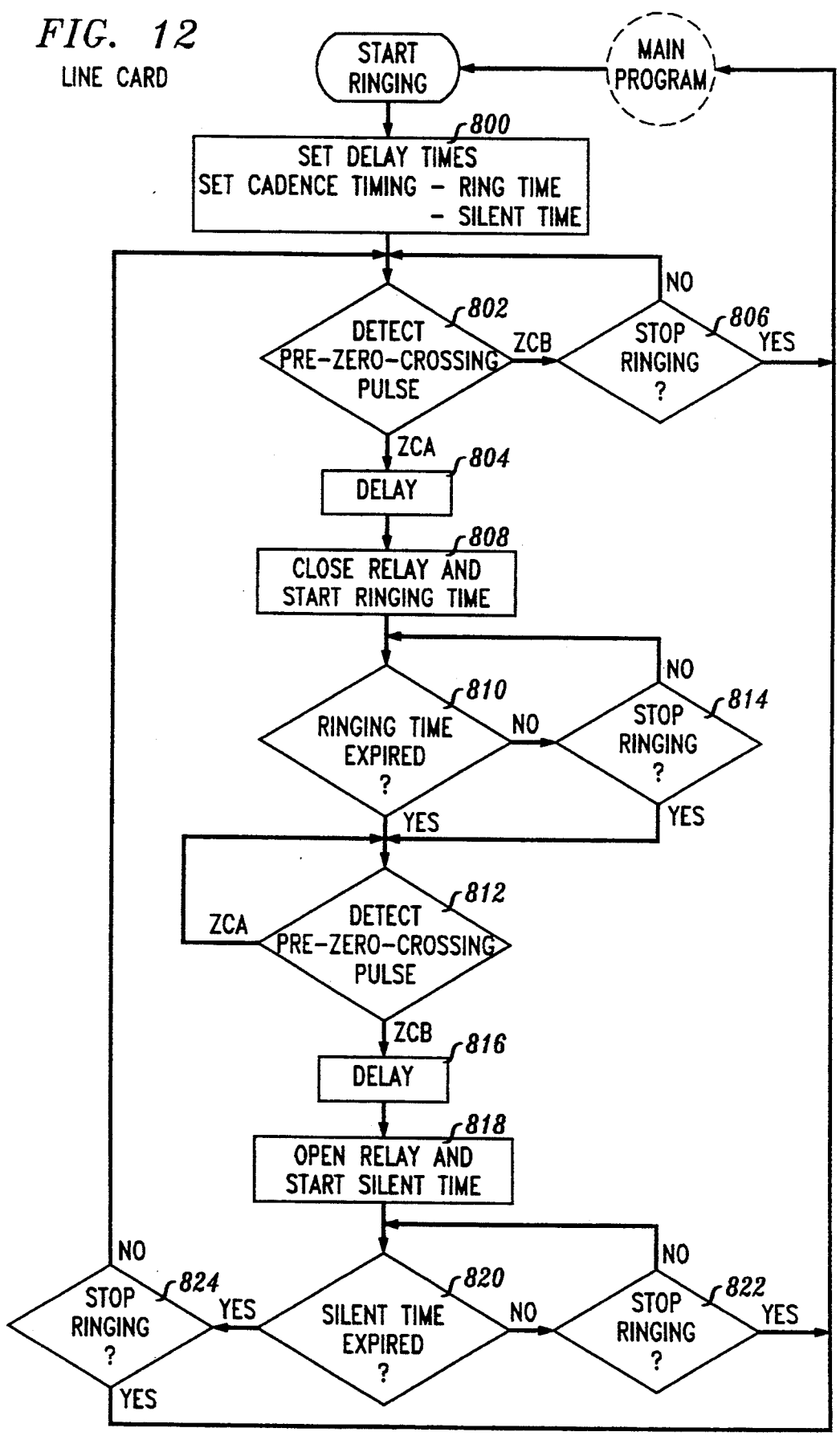
FIG. 12 is a flow chart describing the operation of a line card included in the arrangement of FIG. 1 when the third exemplary method is performed.

FIG. 12 is a flow chart describing the operation of line card 200 (FIG. 1) when the third exemplary method is performed. The processing occurs in microcontroller 201. A main program is executed in microcontroller 201. When microcontroller 201 receives an instruction from control processor SMP to start ringing telephone line 301, the main program is interrupted and execution branches to block 800. In block 800, the ringing cadence is established-i.e., the ringing duration and the silent duration. In addition, delay times are established such that pre-zero-crossing pulses will cause ringing relay 203 to close or open during the appropriate connect time interval or disconnect time interval. Execution continues in block 802 where a pre-zero-crossing pulse is detected. If the detected pulse is a long-duration pulse (ZC signal B), execution branches to decision block 806. If microcontroller 201 has just received a subsequent instruction from control processor SMP to stop ringing, execution returns to the main program. Otherwise execution returns back to block 802. If the pulse initially detected in block 802 is a short-duration pulse (ZC signal A), execution branches to block 804 where the established delay time occurs. After the delay, execution continues in block 808 where microcontroller 201 causes a control voltage to be applied to relay 203 to close its contacts. A ring timer is also initiated in block 808 to time the ringing duration. Execution continues in block 810 where the ring timer is checked to determine whether the ringing time has expired. If not, execution branches to block 814. If microcontroller 201 has not just received a subsequent instruction from control processor SMP to stop ringing, execution returns to block 810 and ringing continues. Upon detection of an expiration of the ringing time in block 810, or in response to an instruction from control processor SMP to stop ringing as determined in block 814, execution continues to block 812 where a pre-zero-crossing pulse is detected. If the detected pulse is a short-duration pulse (ZC signal A), execution simply branches back to block 812. If the pulse detected in block 812 is a long-duration pulse (ZC signal B), execution branches to block 816 where the established delay time occurs. After the delay, execution continues in block 818 where microcontroller causes the control voltage to be removed from relay 203 to open its contacts. A timer is also initiated in block 818 to time the duration of silence. Execution continues in block 820 where the silent time is checked to determine whether the timer has expired. If the timer has not expired, execution branches to block 822. If microcontroller 201 has not just received a subsequent instruction from control processor SMP to stop ringing, execution returns to block 820 and the silent time is continued. If microcontroller 201 has received such a stop ringing instruction, execution returns to the main program. When it is determined in block 820 that the timer has expired, execution proceeds to block 824. If microcontroller 201 has not just received a stop ringing instruction from control processor SMP, execution returns back to block 802 and the described process repeats. However, if microcontroller 201 has just received a stop ringing instruction from control processor SMP, execution returns to the main program.

While the operations of microcontrollers 101 and 201 have been described with respect to FIGS. 11 and 12 for the third exemplary method, modifications and simplifications of the flow charts will be readily apparent for the first and second exemplary methods.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. A method for use in a telephone ringing arrangement including a ringing connection means for selectively effecting connection of ringing voltage to a telephone line, said method comprising the steps of generating a periodic ringing voltage waveform which is continuous throughout a plurality of cycles, and which differs from a purely sinusoidal voltage waveform in that said sinusoidal voltage waveform includes intervals of duration (d) during which the magnitude of said sinusoidal voltage waveform remains less than a predefined voltage threshold, whereas said ringing voltage waveform includes in every cycle a connect interval of a longer duration (d) plus (x) during which the magnitude of said ringing voltage waveform remains less than said predefined voltage threshold, where (x) is a positive constant and where the rms values of said ringing voltage waveform and of said sinusoidal voltage waveform are substantially equal, and said ringing connection means causing said ringing voltage waveform to be applied to said line.

2. A method in accordance with claim 1 where said ringing connection means is a relay having bounce time (b), said step of causing comprising controlling said ringing connection means to connect said ringing voltage waveform to said telephone line such that the connection occurs only during one of said connect intervals and said one connect interval extends beyond said bounce time.

3. A method in accordance with claim 2 wherein said positive constant (x) is dependent on nominal characteristics, including the bounce time (b) of said relay.

4. A method in accordance with claim 3 where (d) plus (x) is greater than or equal to (b).

5. A method in accordance with claim 4 where (d) is less than (b),

6. A method in accordance with claim 2 further comprising the step of providing a predefined dc voltage on said telephone line, in response to an incoming call to said telephone line, disconnecting said predefined dc voltage from said telephone line, and after said disconnecting and prior to said controlling, reconnecting said predefined dc voltage to said telephone line.

7. A method in accordance with claim 2 further comprising the step of generating a train of pulses in synchronism with said ringing voltage waveform, wherein said controlling step occurs in response to an incoming call and one of said pulses.

8. A method in accordance with claim 1 where said connect intervals each include a zero-crossing of said ringing voltage waveform.

9. A method in accordance with claim 8 wherein the slope of said ringing voltage waveform at each said zero crossing within each said connect interval is less than the slope of said sinusoidal voltage waveform at its corresponding zero-crossing.

10. A method for use in a telephone ringing arrangement including a ringing connection means for selectively effecting connection of ringing current to a telephone line, said method comprising the steps of transmitting, on said telephone line via said ringing connection means, a periodic ringing current waveform which differs from a purely sinusoidal current waveform in that said sinusoidal current waveform includes intervals of duration (e) during which the magnitude of said sinusoidal current waveform remains less than a predefined current threshold whereas said ringing current waveform is continuous throughout a plurality of cycles and includes in each of said cycles a disconnect interval of a longer duration (e) plus (y) during which the magnitude of said ringing current waveform remains less than said predefined current threshold, where (y) is a positive constant and where the rms values of said ringing current waveform and of said sinusoidal current waveform are substantially equal, and controlling said ringing connection means to disconnect said ringing current waveform from said telephone line such that the disconnection occurs only during one of said disconnect intervals.

11. A method in accordance with claim 10 further comprising the step of generating a train of pulses in synchronism with said ringing current waveform, wherein said step of controlling occurs in response to one of said pulses.

12. A method in accordance with claim 10 where said disconnect intervals each include a zero-crossing of said ringing current waveform.

13. A method in accordance with claim 12 wherein the slope of said ringing current waveform at each said zero-crossing within each said disconnect interval is less than the slope of said sinusoidal current waveform at its corresponding zero-crossing.

14. A method comprising the steps of generating a periodic ac ringing voltage waveform which, when connected to a telephone line, causes transmission of a periodic ac ringing current waveform, each period of said ringing voltage waveform including only one connect interval, said ringing voltage waveform having one and only one zero-crossing during each said one connect interval, each period of said ringing current waveform including only one disconnect interval, said ringing current waveform having one and only one zero-crossing during each said one disconnect interval, the magnitude of the slopes of both said ringing voltage waveform and said ring current waveforms during said connect interval and said disconnect interval, respectively, being less than the magnitude of the slope of a purely sinusoidal waveform at its zero-crossing, connecting said ringing voltage waveform to a telephone line only during one of said connect intervals, and disconnecting said ringing current waveform from said telephone line only during one of said disconnect intervals.

15. A method in accordance with claim 14 wherein the slope of the ringing voltage waveform during said connect interval and the slope of the ringing current waveform during said disconnect interval are substantially zero.

16. Telephone ringing apparatus comprising means for generating a periodic ringing voltage waveform which is continuous throughout a plurality of periods, and which differs from a purely sinusoidal voltage waveform in that said sinusoidal voltage waveform includes intervals of duration (d) during which the magnitude of said sinusoidal voltage waveform remains less than a predefined voltage threshold, whereas said ringing voltage waveform includes in every period a connect interval of a longer duration (d) plus (x) during which the magnitude of said ringing voltage waveform remains less than said predefined voltage threshold, where (x) is a positive constant and where said ringing voltage waveform and said sinusoidal voltage waveform have an equal rms value, relay means for selectively effecting connection of said ringing voltage waveform to a telephone line, said relay means having a bounce time, and means for controlling said relay means such that said ringing voltage waveform is connected to said line only during one of said connect intervals, and such that said bounce time following said connection is also within said one connect interval.

17. Apparatus in accordance with claim 16 further comprising means for generating a train of pulses in synchronism with said ringing voltage waveform, and wherein said controlling means is responsive to an incoming call and one of said pulses.

18. Apparatus in accordance with claim 16 further comprising battery feed means for providing a predefined dc voltage, battery feed relay means for selectively connecting said battery feed means to said line, means responsive to an incoming call for controlling said battery feed relay means to disconnect said battery feed means from said line, and for subsequently controlling said battery feed means to again connect said battery feed means to said line before said ringing voltage waveform is connected to said line.

19. Apparatus in accordance with claim 16 further comprising capacitor means connected across said line to reduce transients caused by disconnection of said relay means.

* * * * *